United States Patent
Johnstone

[19]

[11] Patent Number: 6,089,517
[45] Date of Patent: Jul. 18, 2000

[54] STUFFED CREATURE MOUNTING DEVICE

[76] Inventor: David R. Johnstone, P.O. Box 7278, Prospect Heights, Ill. 60070-7278

[21] Appl. No.: 08/827,544

[22] Filed: Mar. 28, 1997

[51] Int. Cl.[7] .................................................. A45D 42/14
[52] U.S. Cl. .......................................................... 248/205.5
[58] Field of Search .............................. 248/205.5, 205.6, 248/205.8, 205.9, 206.2, 230.8; 24/625; 446/177

[56] References Cited

U.S. PATENT DOCUMENTS

| | | | |
|---|---|---|---|
| 4,813,641 | 3/1989 | Wilson | 248/206.2 |
| 4,825,515 | 5/1989 | Wolterstorff, Jr. | 24/625 |
| 5,058,922 | 10/1991 | Long | 280/808 |
| 5,118,318 | 6/1992 | Lorizio | 446/72 |
| 5,222,279 | 6/1993 | Frano et al. | 24/625 |
| 5,344,356 | 9/1994 | Pizzelli et al. | 446/73 |
| 5,386,960 | 2/1995 | O'Brien | 248/205.5 |
| 5,391,104 | 2/1995 | George | 446/177 |
| 5,429,335 | 7/1995 | Cunningham | 248/231.8 |
| 5,465,930 | 11/1995 | Wu | 248/96 |
| 5,573,214 | 11/1996 | Jones et al. | 248/311.2 |
| 5,584,106 | 12/1996 | Anscher | 24/625 |

*Primary Examiner*—Ramon O. Ramirez
*Attorney, Agent, or Firm*—Thomas R. Vigil

[57] ABSTRACT

The mounting assembly is used to mount a toy, doll or stuffed creature to an impervious planar surface. The mounting assembly comprises a suction cup having a base portion and a concave suction portion, a strap having a first end and a second end, and a plug for mounting the strap to the base portion of the suction cup, and a buckle assembly for buckling the strap about a toy, doll or stuffed creature whereby the suction cup enables the toy, doll or stuffed creature to be mounted to an automobile window.

8 Claims, 2 Drawing Sheets

STUFFED CREATURE MOUNTING DEVICE

BACKGROUND OF THE INVENTION

1. Field of the Invention

The present invention relates to a mounting assembly for mounting a toy, doll or stuffed creature to a generally vertically extending generally impervious surface, such as a window in an automobile or a bedroom.

2. Description of the Related Art Including Information Disclosed Under 37 CFR §§1.97–1.99.

Heretofore, various devices have been proposed for mounting dolls or toys to a surface. In this respect, reference is made to the following U.S. Patents:

| U.S. Pat. No. | Patentee |
| --- | --- |
| 5,118,318 | Lorizio |
| 5,344,356 | Pizzelli et al. |
| 5,391,104 | George |

The Lorizio U.S. Pat. No. 5,118,318 discloses dolls which represent a son and/or a daughter bearing a family resemblance to a stylized mother and father depicted on a pillow case. Each doll incorporates a suction cup on the back so that it may be fastened to a smooth surface such as a window.

The Pizzelli et al. U.S. Pat. No. 5,344,356 teaches a toy which is provided with holders utilizing VELCRO™ areas, the holders being arranged as receptacles for small items such as bows, combs and barrettes. The toy is preferably a stuffed animal.

The George U.S. Pat. No. 5,391,104 discloses a figurine simulating an invertedly suspended human, i.e. a bungy jumper, and an elastic cord for suspending the figurine from an automobile rear view mirror or window surface. The elastic cord is coupled at one end to a suction cup adapted to be fastened to a rear view mirror and the other end of the cord is adapted to be wrapped around the ankles of the figurine.

Also heretofore there has been proposed, devices for use in automobiles which include a suction cup. In this respect, references is made to the following U.S. Patents:

| U.S. Pat. No. | Patentee |
| --- | --- |
| 5,058,922 | Long |
| 5,429,335 | Cunningham |
| 5,573,214 | Jones et al. |

The Long U.S. Pat. No. 5,058,922 discloses a motor vehicle safety belt comfort device which includes a suction cup that may be releasably adhered to the windshield, side window or other part of a motor vehicle having a clip mounted thereto which may be releasably attached to part of a shoulder strap, a clip that is releasably attached to a seat belt and a cord that extends between the clip and the suction cup for adjusting the tension of the pressure of the belt on the shoulder of the passenger or driver in the vehicle.

The Cunningham et al. U.S. Pat. No. 5,429,335 discloses an article holding strap assembly for an automobile sun visor. The assembly can include a suction cup which can be applied to a sun visor or any other suitable surface such as a windshield, dashboard or side window of an automobile.

The Jones et al. U.S. Pat. No. 5,573,214 discloses a cup holder for use in a motor vehicle. The cup holder includes a strap having upper and lower ends. A suction cup is attached to the upper end and is adapted to be attached to a window such as a shiftable window in the door of the vehicle. The cup holder is connected to the lower end of the strap and includes a base and spaced apart arms defining a cup receiving area between them.

SUMMARY OF THE INVENTION

According to the present invention there is provided a mounting assembly for mounting a toy, doll or stuffed creature to an impervious planar surface, such as an automobile window. The mounting assembly comprises a suction cup having a base portion and a concave suction portion, a strap having a first end and a second end, and a plug for mounting the strap to the base portion of the suction cup, and a buckle assembly for buckling the strap about a toy, doll or stuffed creature whereby the suction cup enables the toy, doll or stuffed creature to be mounted to an automobile window.

DESCRIPTION OF THE PREFERRED EMBODIMENT(S)

Figure 1:
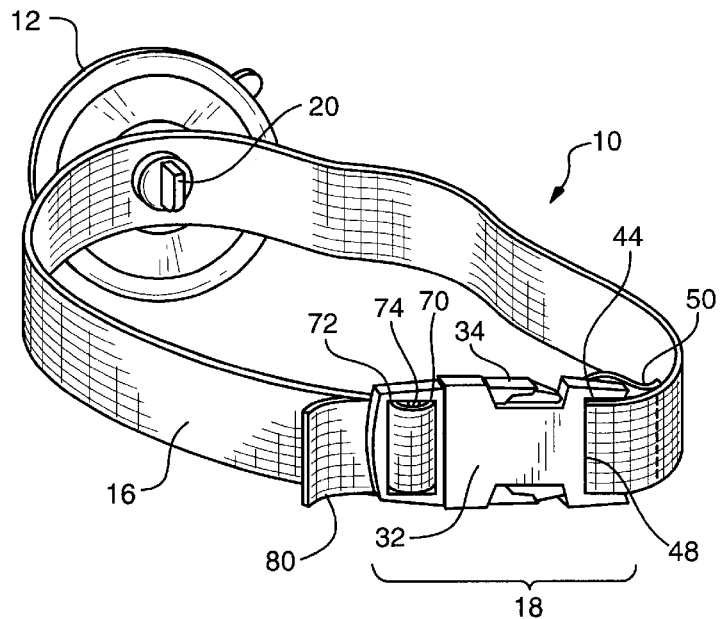
FIG. 1 is a perspective view of the toy, doll or stuffed creature mounting device of the present invention.

As shown in FIG. 1, a toy, doll or stuffed creature mounting assembly 10 of the present invention, includes a suction cup 12 having a concave suction portion 13 and a base portion 14, a strap 16, a buckle assembly 18 and a plug 20 for fixing the strap 16 to the base portion 14 of the suction cup 12.

Figure 2:
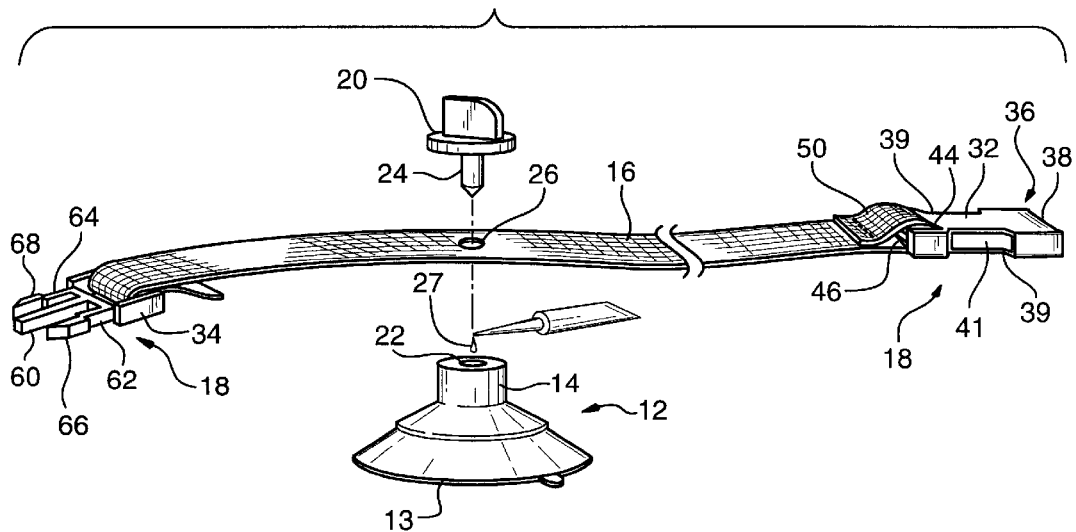
FIG. 2 is an exploded perspective view of the assembly shown in FIG. 1.

As best shown in FIG. 2, the base portion 14 of the suction cup 12 has a hole 22 therein for receiving a pin 24 of the plug 20 which extends through an opening 26 in the strap 16. The opening 26 can be an interstice between strands of a woven strap 16.

Preferably, an adhesive 27 is applied to the pin 24 or to the hole 22 for permanently fixing the strap 16 to the base portion 14 of the suction cup 12 with the plug 20.

Also, it will be noted that the strap 16 is preferably made of a woven fabric material such that the opening 26 easily can be formed by spreading apart threads of the woven fabric material.

The buckle assembly 18 is a two-piece assembly which includes a female receptacle piece 32 and a male flexible tongue piece 34, which can be squeezed to release the tongue piece 34 from the receptacle piece 32, much like a buckle of a seat belt assembly. It should be noted, that an important feature of the mounting assembly 10 is the use of a squeezable or pressable buckle part, tongue piece 34, for releasing or uncoupling the buckle assembly 18, like a buckle assembly in a in a seat belt assembly in a vehicle. In this way, the safety habit of buckling up with a seat belt is reinforced when buckling up a toy, doll or stuffed creature in the mounting assembly 10. This is further reinforced by marketing the mounting assemblies 10 under the trademark "BUCKLE-UPS".

The female receptacle piece 32 has a body 36 with a slot or pocket 38 in one end thereof for snap-fittingly receiving the tongue piece 34. For this purpose, the body 36 has cut-aways 39 on each side thereof creating side openings 41 on each side which create an opening on each side to the pocket or slot 38 to permit the tongue piece 34 to snap into the body 36 after it enters the pocket or slot 38. At the other end of the receptacle piece 32 is a transverse slit 44 (FIG. 1), transversely across the plane of the strap 16 and defined between a bar 46 (FIG. 2) extending across the body 36, and an end wall 48 (FIG. 1) of the body 36. One end 50 of the strap 16 extends around the bar 46 through the slit 44 and is fixed, such as by stitching, to the strap 16 to form a fixed loop fixedly connected to the female receptacle piece 32 of the buckle assembly 18.

In the illustrated embodiment, the tongue piece 34 is defined by a center prong 60 and two side prongs 62 and 64 that have an oval or arrowhead shaped end 66, 68 for being received, in a snap-fittingly manner, in the slot 38 in the female receptacle piece 32. Also, the male tongue piece 34 of the buckle assembly 18 has two slits 70 and 72 (FIG. 1) separated by a strut 74 extending transversely across the tongue part 34, i.e., transversely across the plane of the strap 16, whereby a free end 80 of the strap 16 can be received upwardly through the first slit 70, upwardly over the strut 74 and downwardly through the second slot 72 and then rearwardly in line with the remainder of the strap 16 as best shown in FIG. 1.

Figure 3:
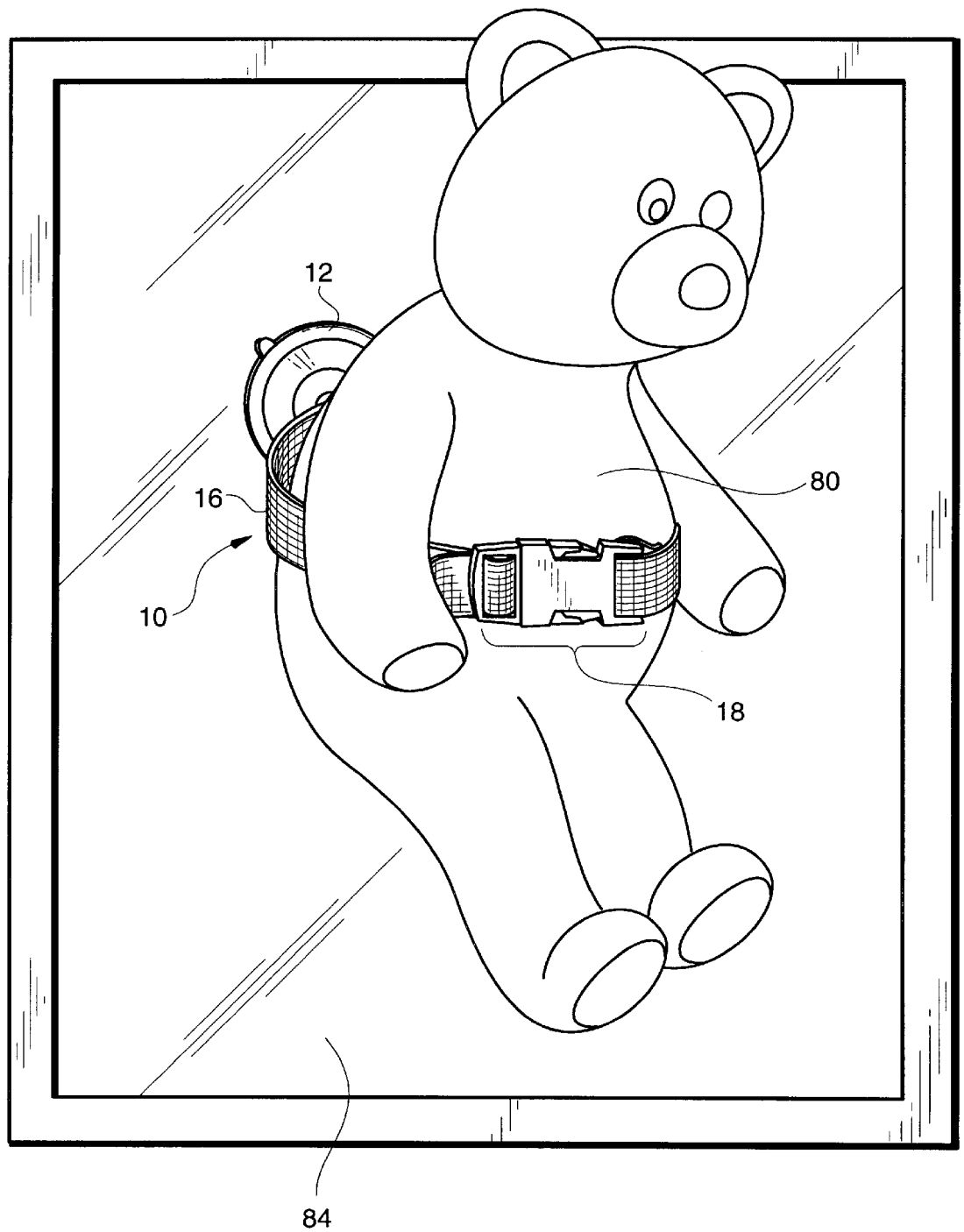
FIG. 3 is a perspective view of the stuffed creature mounting assembly of the present invention affixed to a window and mounting therein a teddy bear-like stuffed toy creature.

Again, the mounting assembly 10 is preferably sold under the trademark "BUCKLE-UPS" to emphasis the buckling of a belt around a creature which, as shown in FIG. 3, can be a teddy bear-like creature 80, such as one of the stuffed creatures sold under the trademark "BEANIE BABY". This emphasis of the buckling up of the stuffed creature with a strap 16 and squeezable or press-release buckle assembly 18 emphasis to a youngster to buckle up his or her seat belt when in an automobile.

Furthermore, the releasable buckle assembly 18 enables a youngster to change the stuffed creature so that on one day the youngster can take one stuffed creature with him or her and mount the stuffed creature to the window, e.g., window 84 in a bedroom or of a vehicle and on another day, take another stuffed creature in the vehicle.

Although any type of toy, doll or stuffed creature can be mounted with the mounting assembly 10, one preferred creature is a stuffed toy creature sold under the trademark BEANIE BABY™.

Another important feature of the mounting assembly 10 of the present invention is its simplicity in permitting a child to mount several different toys, dolls or stuffed creatures in a line on an vehicle window 84 with several mounting assemblies 10, and for periodically changing a toy, doll or stuffed creature in the line or for permitting easy changing of the order of the toys, dolls or stuffed creatures in the line.

From the foregoing description, it will be apparent that the mounting assembly 10 of the present invention has a number of advantages, some of which have been described above and others of which are inherent in the invention. Also it will be understood that modifications can be made to the mounting assembly 10 of the present invention described above without departing from the teachings of the present invention. Accordingly, the scope of the invention is only to be limited as necessitated by the accompanying claims.

I claim:

1. A mounting assembly for mounting a toy, doll or stuffed creature to a stationary, impervious planar surface, said mounting assembly comprising a suction cup having a base portion and a concave suction portion, a non-resilient non-elastic strap having a first end and a second end, means for mounting said strap to said base portion of said suction cup, and a buckle assembly adjustably coupled to said first and second ends of said strap for buckling said strap about a toy, doll or stuffed creature whereby said suction cup enables the toy, doll or stuffed creature to be mounted to and displayed on the planar surface which can be a bedroom window or an automobile window.

2. The assembly of claim 1 wherein said buckle assembly includes a female receptacle piece and a male tongue piece which snap-fittingly engage each other and which are released from each other by squeezing or pressing.

3. The assembly of claim 2 wherein said strap has a loop at one end which extends through a slit at one end of said female receptacle piece and said tongue having spaced apart slits separated by a strut whereby the other end of said strap can be received through one slit, around said strut and out through said second slit.

4. The assembly of claim 2 wherein said female receptacle piece has a body with a slot or pocket in one end thereof for snap-fittingly receiving said tongue piece and said tongue piece is defined by a center prong and two side prongs each having an oval or arrowhead shaped end for being received, in a snap-fittingly manner, in said slot in said female receptacle piece.

5. The assembly of claim 1 wherein said strap is made of a woven fabric material.

6. A mounting assembly for mounting a toy, doll or stuffed creature to a stationary, impervious planar surface, said mounting assembly comprising a suction cup having a base portion and a concave suction portion, a strap having a first end and a second end, means for mounting said strap to said base portion of said suction cup, and a buckle assembly coupled to said first and second ends of said strap for buckling said strap about a toy, doll or stuffed creature whereby said suction cup enables the toy, doll or stuffed creature to be mounted to and displayed on the planar surface which can be a bedroom window or an automobile window, said means for mounting said strap to said suction cup including a mounting hole in said base portion of said suction cup and a plug which is adapted to extend through an opening in said strap and into said mounting hole in said base portion of said suction cup.

7. The assembly of claim 6 wherein said plug has a pin end which is received in said mounting hole.

8. The assembly of claim 7 wherein said plug is fixed in said hole by an adhesive.

* * * * *